US010617931B2

(12) United States Patent
Galster

(10) Patent No.: US 10,617,931 B2
(45) Date of Patent: Apr. 14, 2020

(54) PORTABLE GOLF PRACTICE SWING SURFACE

(71) Applicant: Jacob Galster, Chicago, IL (US)

(72) Inventor: Jacob Galster, Chicago, IL (US)

(73) Assignee: RANGE SAVERS LLC, Chicago, IL (US)

(*) Notice: Subject to any disclaimer, the term of this patent is extended or adjusted under 35 U.S.C. 154(b) by 0 days.

(21) Appl. No.: 16/407,533

(22) Filed: May 9, 2019

(65) Prior Publication Data

US 2019/0344147 A1 Nov. 14, 2019

Related U.S. Application Data

(60) Provisional application No. 62/669,337, filed on May 9, 2018.

(51) Int. Cl.
A63B 69/36 (2006.01)
E01C 13/02 (2006.01)
A01G 9/033 (2018.01)

(52) U.S. Cl.
CPC .......... *A63B 69/3661* (2013.01); *A01G 9/033* (2018.02); *E01C 13/02* (2013.01)

(58) Field of Classification Search
CPC ............ A63B 69/3661; A63B 69/3623; A01G 9/033; E01C 13/02
USPC ................................. 473/262, 278, 279, 409
See application file for complete search history.

(56) References Cited

U.S. PATENT DOCUMENTS

| 5,309,846 | A | * | 5/1994 | Peterson | E01C 13/083 108/53.3 |
| 5,803,820 | A | * | 9/1998 | McCarty | A63B 69/3661 473/162 |
| 5,830,080 | A | * | 11/1998 | Reynolds | A63B 69/3661 473/278 |
| 6,302,803 | B1 | * | 10/2001 | Barlow | A63B 69/3661 473/160 |
| 6,705,953 | B2 | * | 3/2004 | Haskins | A63B 69/3661 473/150 |
| 7,568,980 | B1 | * | 8/2009 | Janus | A63B 69/3661 473/278 |
| 2006/0242901 | A1 | * | 11/2006 | Casimaty | A63C 19/00 47/65.9 |

* cited by examiner

Primary Examiner — Nini F Legesse
(74) Attorney, Agent, or Firm — Justin Lampel

(57) ABSTRACT

A portable golf practice swing surface is provided. The portable golf practice swing surface has a base for receiving a segment of real sod. A securing strip secures the sod to the base, for example, along three of the exterior edges of the top of the sod. A plurality of securing devices, such as screws, then secure the securing strip to the base, therein locking the sod to the base. In an embodiment the securing strip has a plurality of teeth for better gripping the sod. The device allows a user to practice a golf swing on real grass and further allows the grass to be changed for fresh grass once worn. A rotatable handle may be provided which allows for the easy movement of the portable golf practice swing surface.

20 Claims, 12 Drawing Sheets

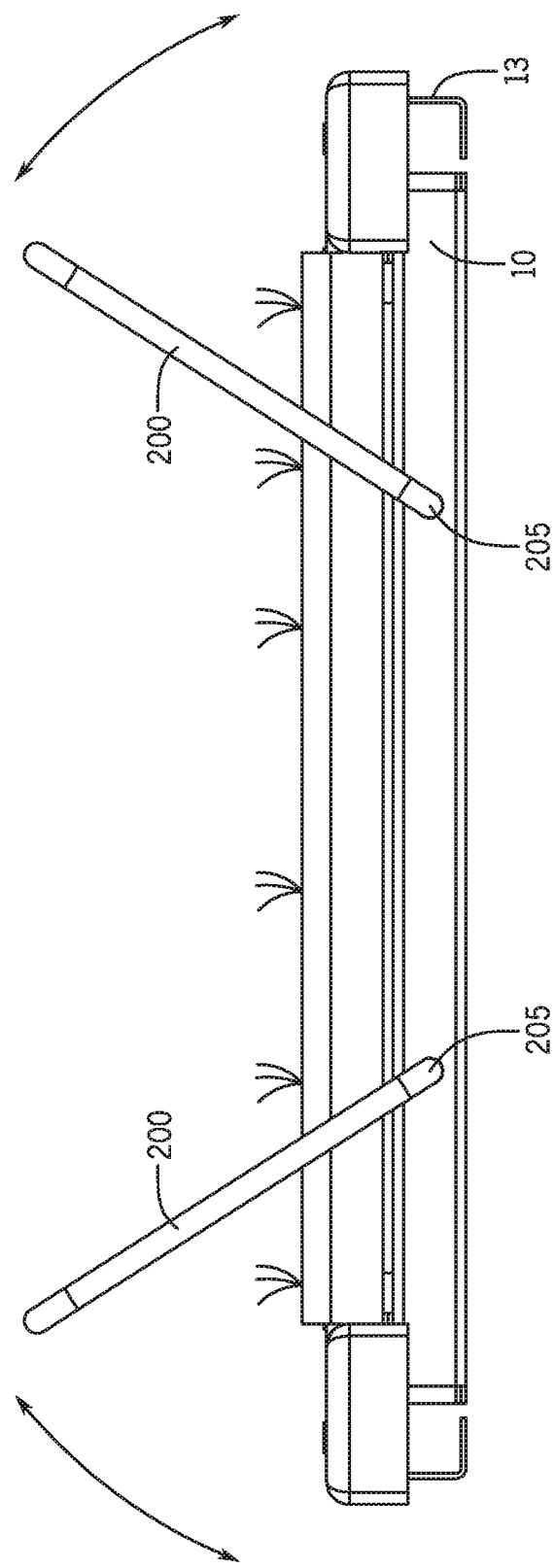

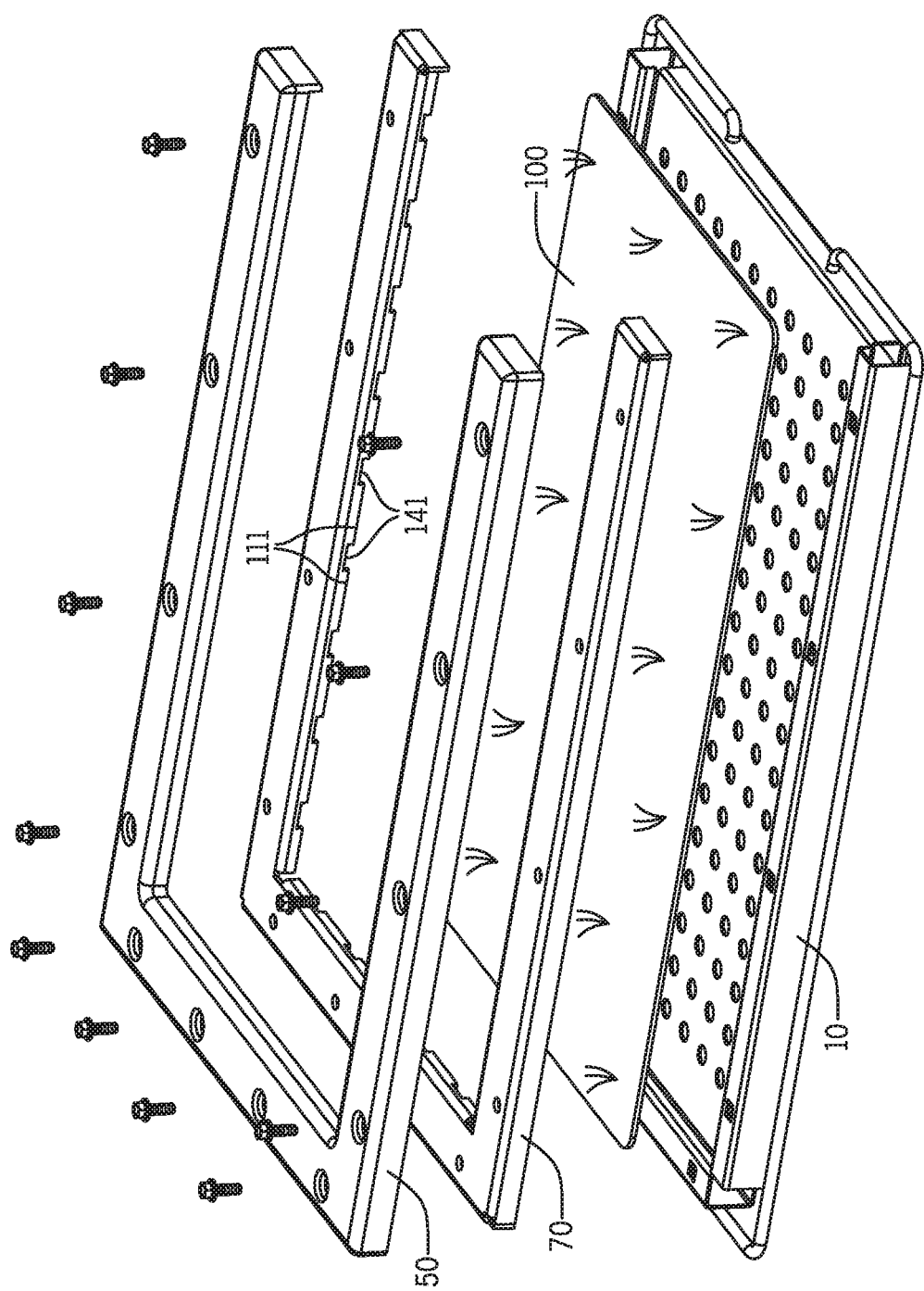

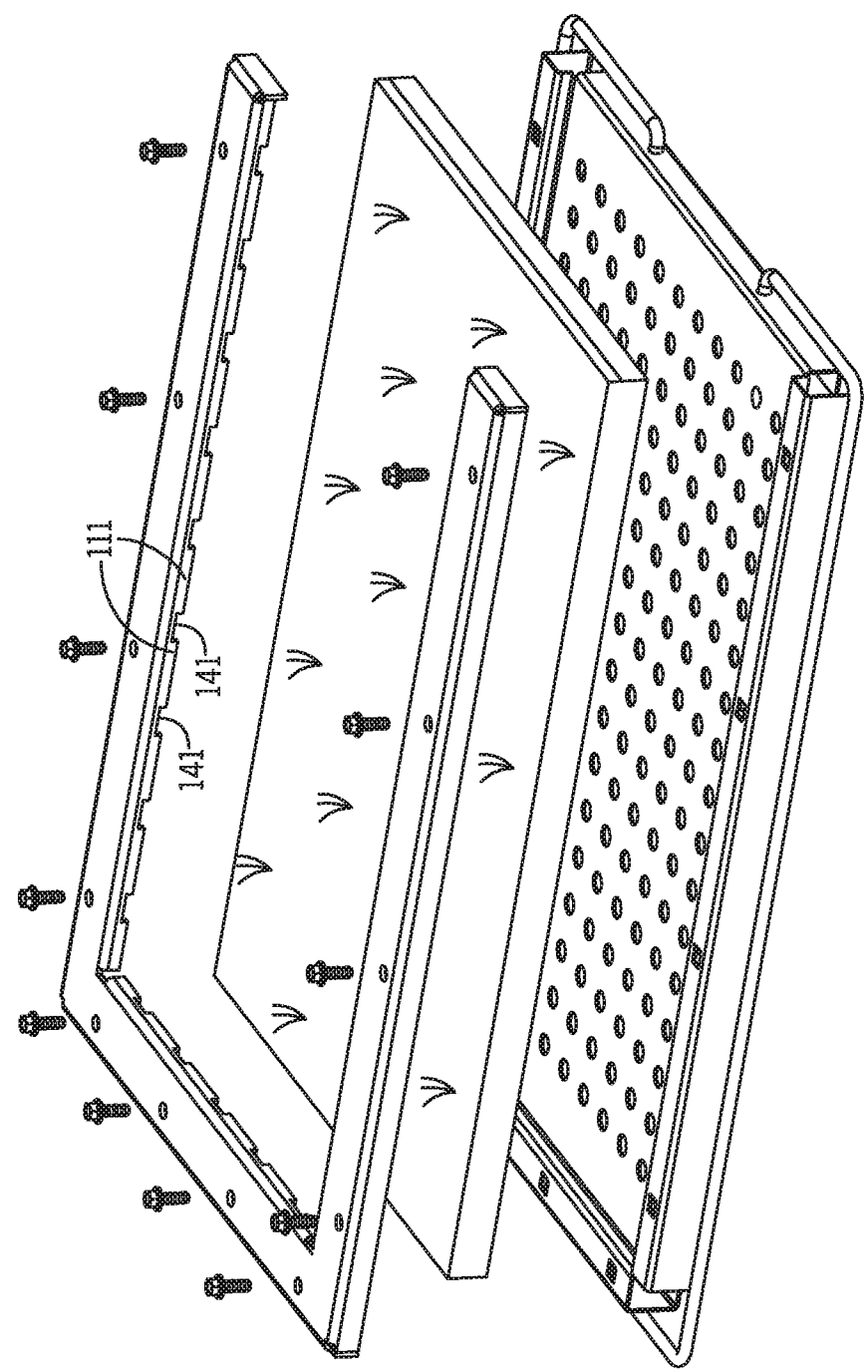

PORTABLE GOLF PRACTICE SWING SURFACE

REFERENCE TO RELATED APPLICATIONS

This application claims priority to U.S. Provisional Application No. 62/669,337 which was filed on May 9, 2018, the entire contents of which are incorporated by reference herein.

BACKGROUND OF THE INVENTION

A portable golf practice swing surface is provided. The portable golf practice swing surface has a base for receiving a segment of real sod. A securing strip secures the sod to the base, for example, along three of the exterior edges of the top of the sod. A plurality of securing devices, such as screws, then secure the securing strip to the base, therein locking the sod to the base. In an embodiment the securing strip has a plurality of teeth for better gripping the sod. The device allows a user to practice a golf swing on real grass and further allows the grass to be changed for fresh grass once worn. A rotatable handle may be provided which allows for the easy movement of the portable golf practice swing surface.

Every serious golfer knows that the only way to improve your golf game is to practice, practice and then practice some more. The most common place to practice is on the driving range. There are typically two types of driving range surfaces, real grass or synthetic mats. Although synthetic mat surfaces have much less maintenance requirements, real grass is the best option for improving your golf game.

Over the years, attempts have been made to provide improved sports or golf playing surfaces. For example, U.S. Pat. No. 7,568,980 to Janus et al. discloses a golf mat having upstanding side walls and a bottom made of a flexible material to enable the same to be rolled up. The mat can be filled with grass sod to present an upper natural playing surface for practicing golf shots. The side walls can be extended upwardly and the mat filled with sand to present a different, but natural playing surface to a golfer practicing sand shots.

Further, U.S. Pat. No. 5,803,820 to McCarty discloses a portable sand trap for use as a golf instructional for teaching and practicing golf shots from sand. The portable sand trap is placed in various locations and at various distances from a target or hole on a driving range, golf course, indoor practice facility or personal property. The apparatus includes a base having a bottom section, a sidewall, and an open top. The bottom section and the sidewall form an internal retention area in the base. The internal retention area is designed for holding sand. The apparatus is rendered mobile through a plurality of ground engaging wheels attached to the base. The base may be pushed or towed about by an individual or by a vehicle.

Still further, U.S. Pat. No. 5,309,846 to Peterson discloses a system for creating a temporary grass playing field. The system includes a plurality of substantially identical pallets, each pallet having a base with a top surface and a bottom surface. The pallets are polygonal in shape and are adapted to abut against each other to form the playing field. Reinforcing brackets are secured to the bottom surface of the base to elevate the base above a ground support surface by a distance sufficient to enable the fork of a forklift truck to be inserted under the base and the lift the pallet. Grass sod corresponding in shape to the base is then supported on the top surface of the base. This grass forms the temporary grass playing field when the pallets are nested together so that the sides of the pallets abut against each other.

However, these patents fail to describe a portable golf practice swing surface which is easy to use and efficient as is described in the present application. Further, these patents fail to provide a portable golf practice swing surface which allows a golfer to practice a golf swing in a natural manner using real grass.

SUMMARY OF THE INVENTION

A portable golf practice swing surface is provided. The portable golf practice swing surface has a base for receiving a segment of real sod. A securing strip secures the sod to the base, for example, along three of the exterior edges of the top of the sod. A plurality of securing devices, such as screws, then secure the securing strip to the base, therein locking the sod to the base. In an embodiment the securing strip has a plurality of teeth for better gripping the sod. The device allows a user to practice a golf swing on real grass and further allows the grass to be changed for fresh grass once worn. A rotatable handle may be provided which allows for the easy movement of the portable golf practice swing surface.

An advantage of the portable golf practice swing surface is that the sod may be easily and quickly replaced once worn with new sod and the surface then reused.

Another advantage of the present portable golf practice swing surface is that the present portable golf practice surface prevents injury to a golfer, including elbow, wrist and shoulder injuries.

An advantage of the present portable golf practice swing surface is that the present portable golf practice surface allows for much more accurate practicing of a golf swing.

Another advantage of the present portable golf practice swing surface is that the present device allows for a user to secure short grass, medium height grass or tall grass to the base of the device so that a player can practice his/her golf swing on different playing surfaces for a more complete golf practice session.

Still another advantage of the present portable golf practice swing surface is that the present device allows a user to practice regular full swings or shorten swings for a more complete practice session.

An advantage of the present portable golf practice swing surface is that the present portable golf practice swing surface allows a user to properly adjust a real tee as opposed to non-adjustable rubber tees commonly used on synthetic mat surfaces.

Yet another advantage of the present portable golf practice swing surface is that the present portable golf practice surface allows a user to see a divot location and to adjust his/her swing accordingly.

For a more complete understanding of the above listed features and advantages of the present portable golf practice swing surface reference should be made to the detailed description and the detailed drawings. Further, additional features and advantages of the invention are described in, and will be apparent from, the detailed description of the preferred embodiments.

BRIEF DESCRIPTION OF THE DRAWINGS

FIG. 7 illustrates an embodiment of the portable golf practice swing surface wherein the rotatable handles are in the second orientation and wherein the surface is now suitable for carrying.

FIG. 8 an exploded view of the portable golf swing surface wherein the securing strip have a plurality of teeth for better securing of the sod.

FIG. 9 an exploded view of the portable golf swing surface wherein the securing strip have a plurality of teeth for better securing of the sod.

DETAILED DESCRIPTION OF THE PREFERRED EMBODIMENTS

A portable golf practice swing surface and system is provided. The portable golf practice swing surface has a base for receiving a segment of real sod. A securing strip secures the sod to the base, for example, along three of the exterior edges of the top of the sod. A plurality of securing devices, such as screws, then secure the securing strip to the base, therein locking the sod to the base. In an embodiment the securing strip has a plurality of teeth for better gripping the sod. The device allows a user to practice a golf swing on real grass and further allows the grass to be changed for fresh grass once worn. A rotatable handle may be provided which allows for the easy movement of the portable golf practice swing surface.

Figure 1:
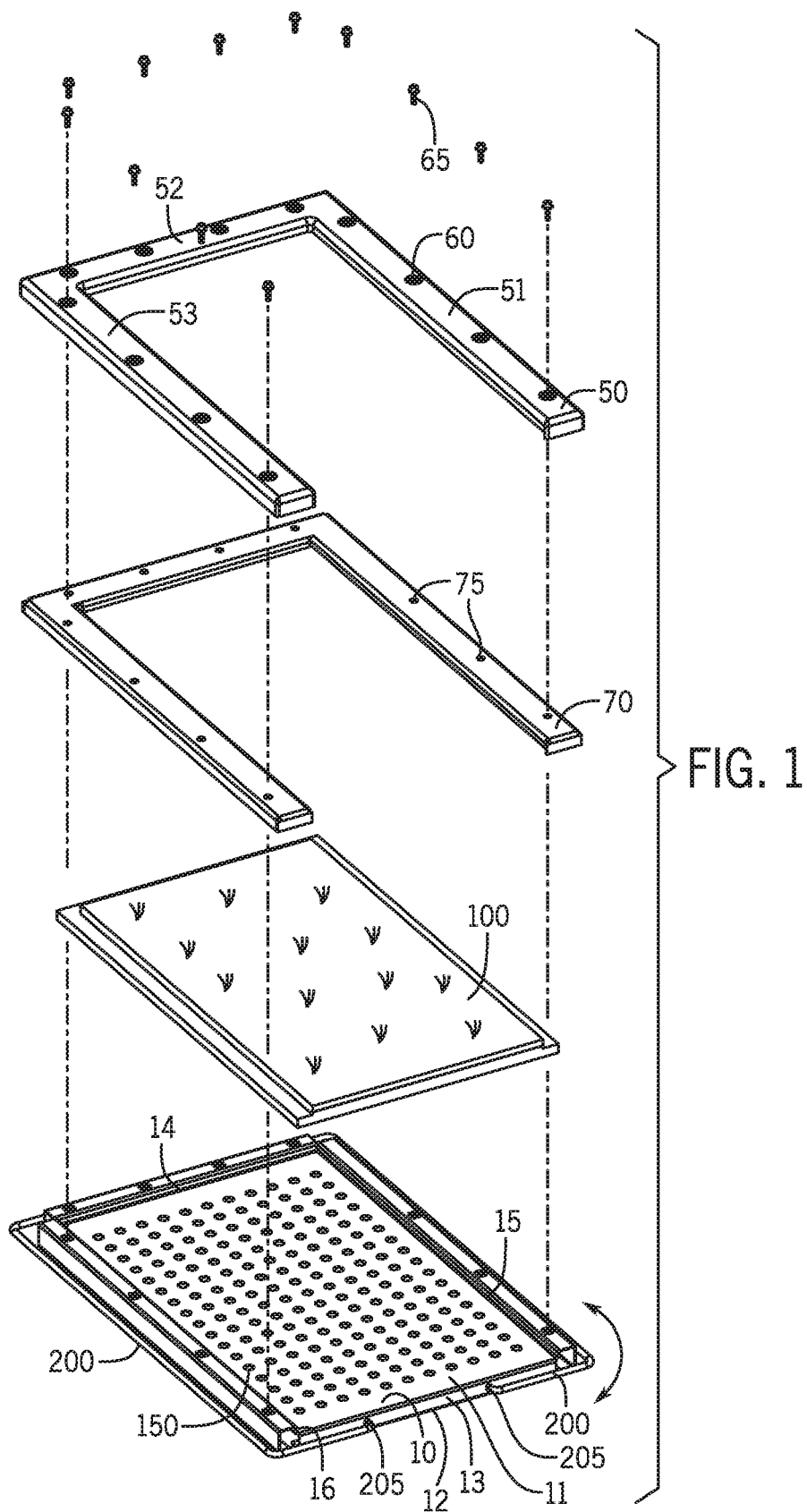
FIG. 1 illustrates an exploded view of an embodiment of the portable golf practice swing surface.

Referring now to FIG. 1, in an embodiment, a portable golf practice swing surface 1 is provided. In an embodiment, the portable golf practice swing surface 1 may have at least a base 10, a protective strip 50, a securing strip 70 and replaceable real sod 100. A golf tee 701 may be inserted into the sod 100 and a golf ball 702 placed on the tee 701. The base 10 and the securing strip 70 are preferably made of a durable material such as, for example, metal which can withstand exposure to outdoor elements or a strike from a golf club whereas the protective strip 50 is preferably made of rubber. In an embodiment, the metal is aluminum. In an alternative embodiment, the securing strip 70 is made of a durable plastic. The base 10 may have a top 11, a bottom 12, a front 13, a back 14, a first side 15 and a second side 16.

In an embodiment, the base 10 may have a plurality of holes 150. The plurality of holes 150 of the base 10 may extend all the way through the base 10 from the top to the bottom of the base 10 and may allow the sod 100 to be properly watered while secured to the top 11 surface of the base 10 and may allow excess water to drain from the sod 100 prior to use. As a result, an operator of a driving range may secure new sod 100 to a plurality of bases 10 prior to use and may water the plurality of sod surfaces 100 so that the devices are ready to go once golfers grab a surface 1 for practice.

Figure 5:
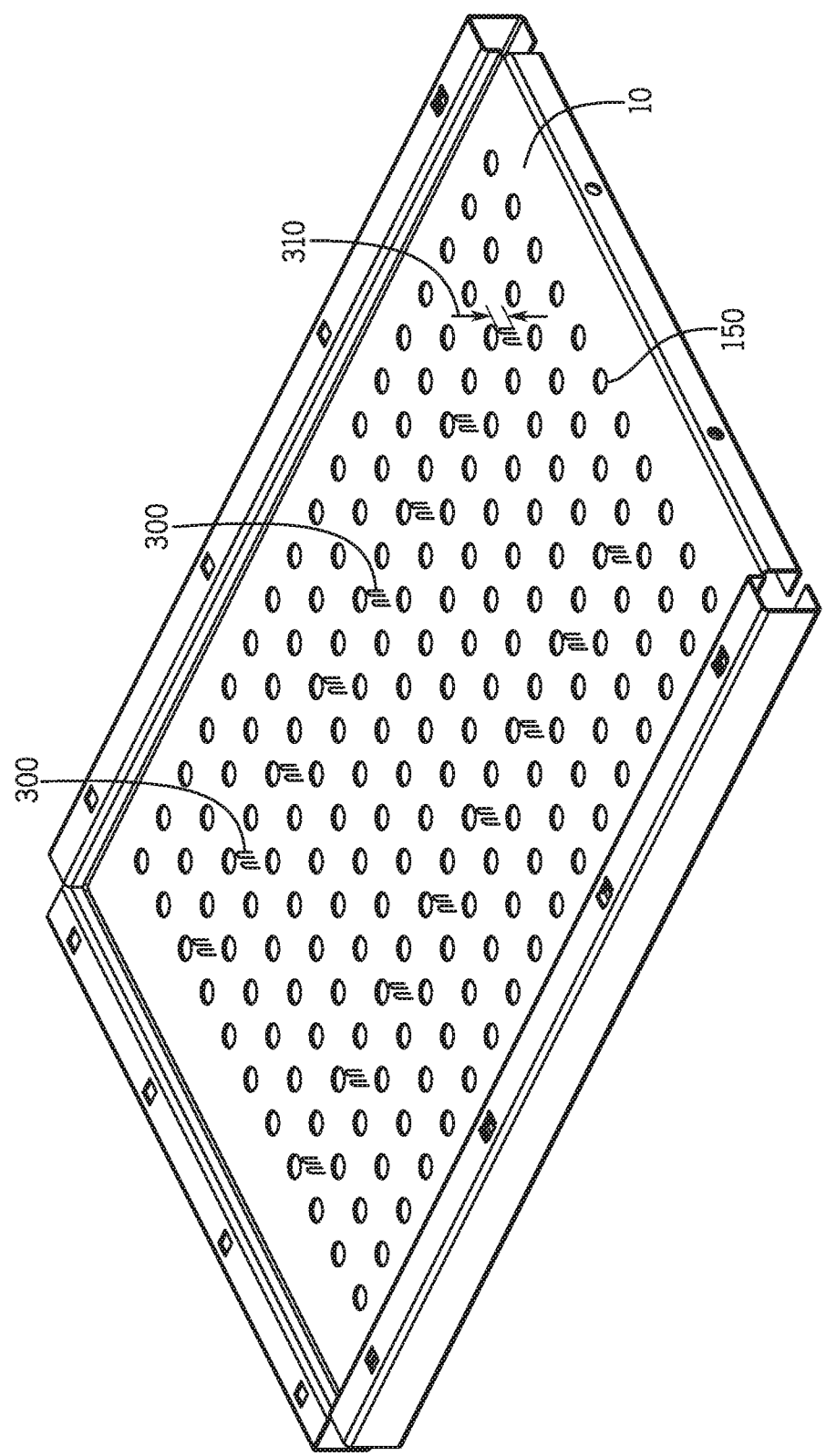
FIG. 5 illustrates a perspective view of an embodiment of the base of the portable golf practice swing surface in one embodiment.
Figure 6A:
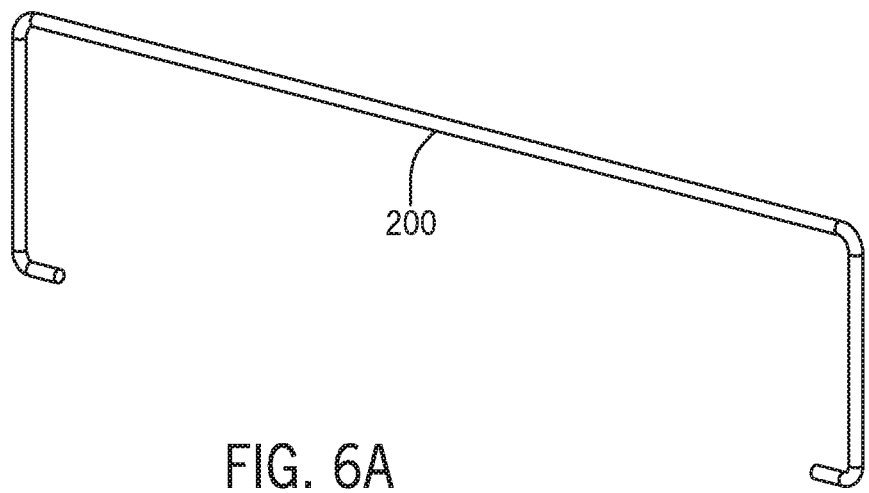
FIG. 6A illustrates a perspective view of the handle of the portable golf swing in an embodiment.
Figure 6B:
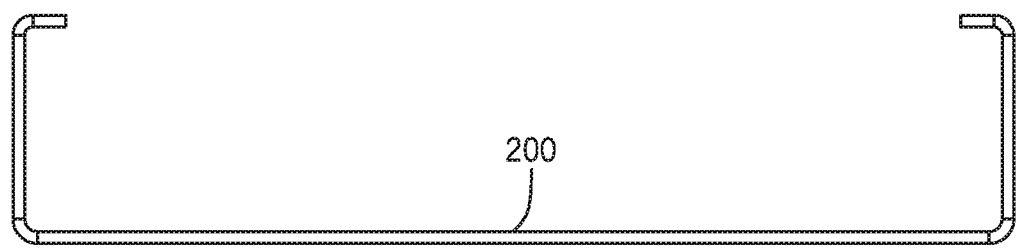
FIG. 6B illustrates a side view of the handle of the portable golf practice swing surface in an embodiment.
Figure 6C:
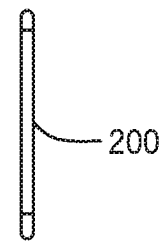
FIG. 6C illustrates a front view of the handle of the portable golf practice swing surface in an embodiment.

In one alternative embodiment (as shown in FIG. 5) the top surface 11 of the base 10 may optionally have a plurality of spikes 300. The plurality of spikes 300 of the base 10 may be inserted into the underside of the sod 100 during use so as to better secure the sod 100 and prevent movement of the sod 100 during use of the device. The plurality of spikes 300 may have a length 310 which is less than the thickness 340 of the sod 100 (preferably no more than half the thickness 340 of the sod 100) so that the plurality of spikes 300 do not accidentally penetrate the top surface of the sod 100 and cause injury to a golfer or otherwise damage the sod 100.

In an embodiment, the protective strip 50 may have a first arm 51, a second arm 52 and a third arm 53. A plurality of holes 60 may be located on the protective strip 50 wherein the holes 60 receive securing devices 65 (such as screws). The protective strip 50 may merely provide padding to cover the securing strip 70, which is preferably, but not exclusively made of metal.

In an embodiment, the securing strip 70 may only secure the sod 100 on three of the four edges of the sod 100. The securing strip 70 may be used to secure a segment of, for example, real sod 100 to the top 11 of the base 10. In particular, the securing strip 70 may prevent the sod 100 from shifting or becoming dislodged from the top 11 of the base 10 during use. Once worn, the sod 100 may be replaced with fresh sod 100. As a result, a golfer may stand, for example, next to the surface 1 with his/her front toward the center of the base 10 and stand so that there is no front strip of the protective strip 50 or the securing strip 70 at the front 13 of the base 10 which might interfere with the travel of the golf ball once struck.

Figure 3:
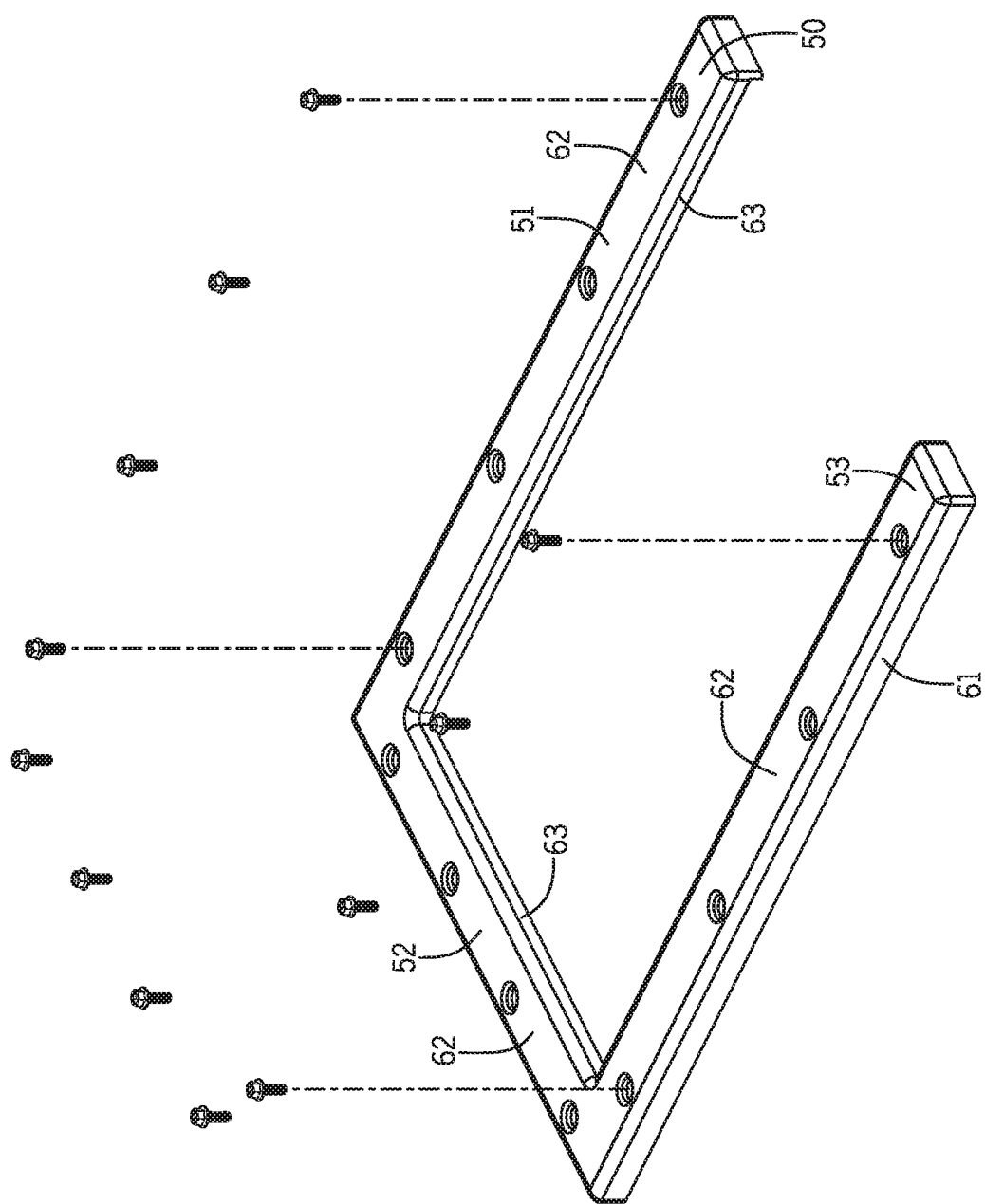
FIG. 3 illustrates a perspective view of an embodiment of the protective strip of the portable golf practice swing surface.
Figure 4:
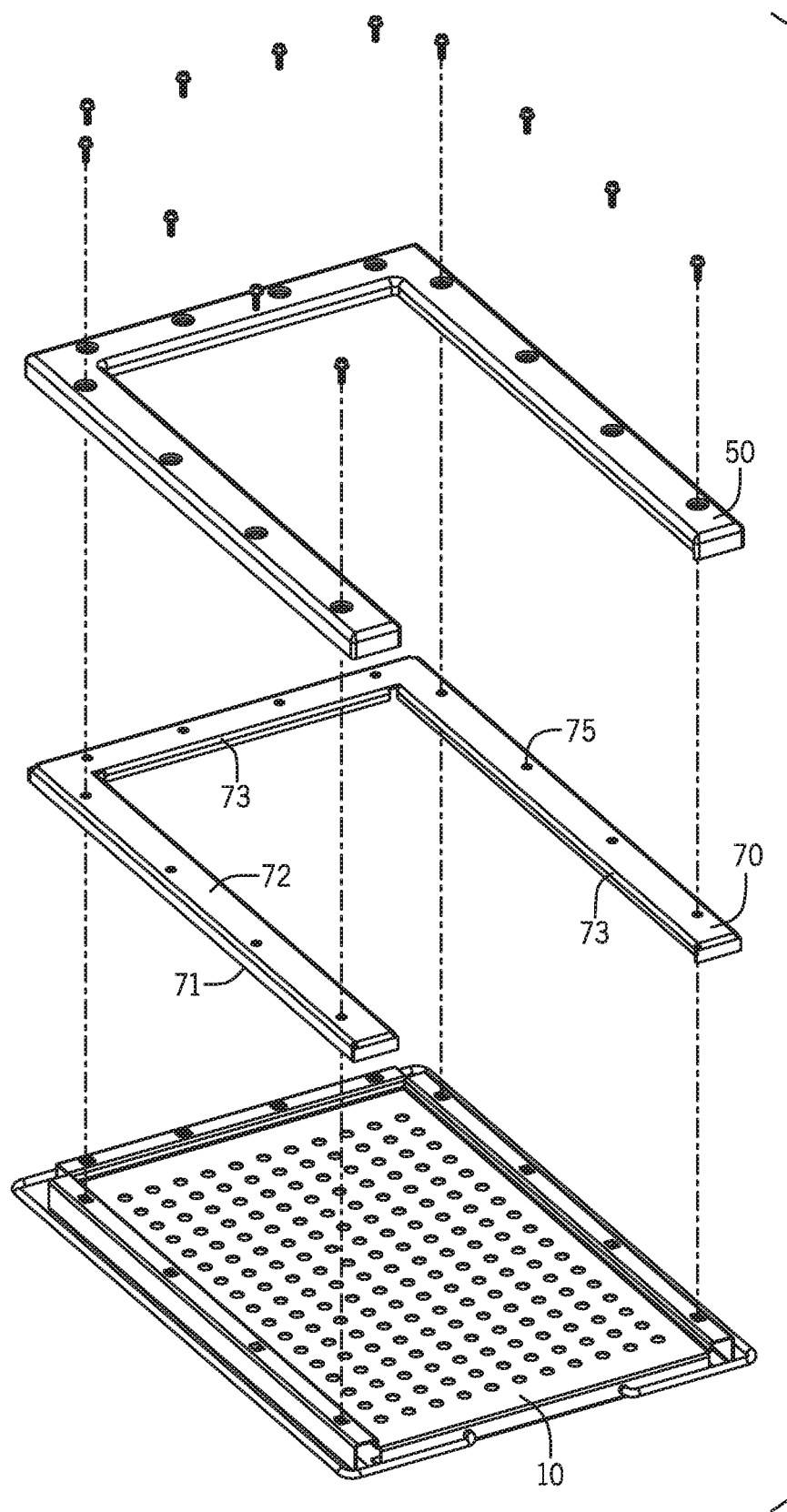
FIG. 4 illustrates an exploded view of an embodiment of the portable golf practice swing surface (without the sod).

Referring now to FIG. 3, in an embodiment, each arm 51, 52 and 53 of the protective strip 50 each has a first edge 61, a top edge 62 and a second edge 63 wherein the first edge 61, top edge 62 and second edge 63 extend the entire length of the protective strip 50. The first edges 61 of the three arms 51, 52 and 53 of the protective strip 50 may define the exterior perimeter of the surface 1 once the protective strip 50 is properly secured to the securing strip 70. The second edges 63 of the secure strip arms 51, 52 and 53 may be the interior edges of the protective strip 50.

Figure 12:
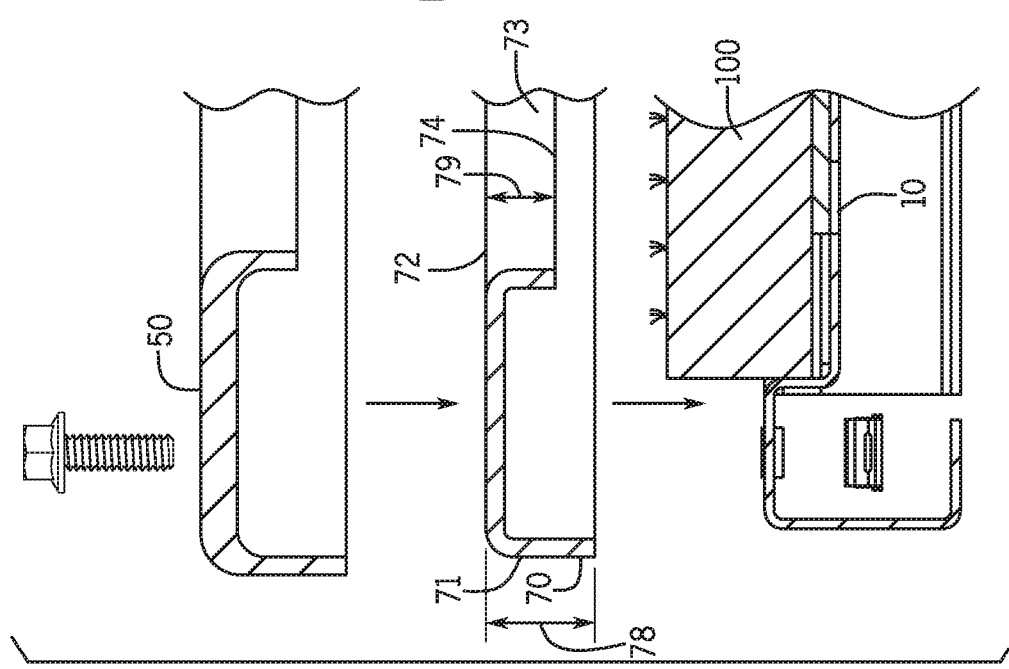
FIG. 12 illustrates a cross-sectional view of an embodiment of the protective strip, the securing strip, the sod and the base of the portable golf practice swing surface.

Referring now to FIG. 12, in an embodiment, the securing strip 70 protects the movement of the sod 100 while the sod 100 is being struck by a club. The securing strip 70 also allows a user to carry the surface 1 without the sod 100 falling off during transportation of the surface 1. In an embodiment, the securing strip 70 has three arms similar to that of the protective strip 50. In addition, each arm of the securing strip 70 may have a first edge 71, a second edge 72 and a third edge 73 wherein the second edge 72 is the top surface of the securing strip 70, wherein the first unit 71 defines the outer-edge of the securing strip 70 and wherein the third edge 73 is the interior facing edge of the securing strip 70.

In an embodiment, the third edge 73 actually digs partially, but not completely, into the sod 100 while the first edge 71 (and top edge 72) does not. Further, in an embodiment, the first edge 71 has a length 78 which is longer than a length 79 of the third edge 73 so that the sod 100 is not completely cut and allowed to shift in an unwanted manner. Thus, the terminal edge 74 of the third edge 73 is located within the sod 100 during use. FIG. 12 illustrates a cross section of only one of the three 'arms' of the protective strip 50, the securing strip 70, the sod 100 and the base 10. In use, the three arms of each of the protective strip 50 and the securing strip 70 extend around the three surfaces of the base 10. The securing strip 70 may have a plurality of holes 75 which correspondingly align with the holes 60 of the protective strip 50 and holes in the base 10.

In an embodiment, the portable golf practice swing surface 1 may have a first and a second rotatable handle 200 (FIGS. 1 and 6A-6C). The rotatable handles 200 may be secured to, for example, both the front 13 and the back 14 of the base 10 at a pivot point 205 and may allow the handles 200 to rotate from a first position (FIG. 1) wherein the rotatable handles 200 remain parallel to the base 10 during use, to a second position (FIG. 7) wherein the rotatable handles 200 may be located either above or below the base 10 so that a user may more easily carry the surface 1 to a proper location to practice a golf swing.

Referring now to FIGS. 8 and 9, in an embodiment, the securing strip 70 of the device 1 may have a plurality of teeth 111. The plurality of teeth 111 may be separated by a plurality of spaces 141. The plurality of teeth 111 may be located on, for example, only the interior facing edge (or third edge 73) of the securing strip 70 and may allow the securing strip 70 to better grasp the sod 100 and secure the sod 100 to the base 10.

Figure 10:
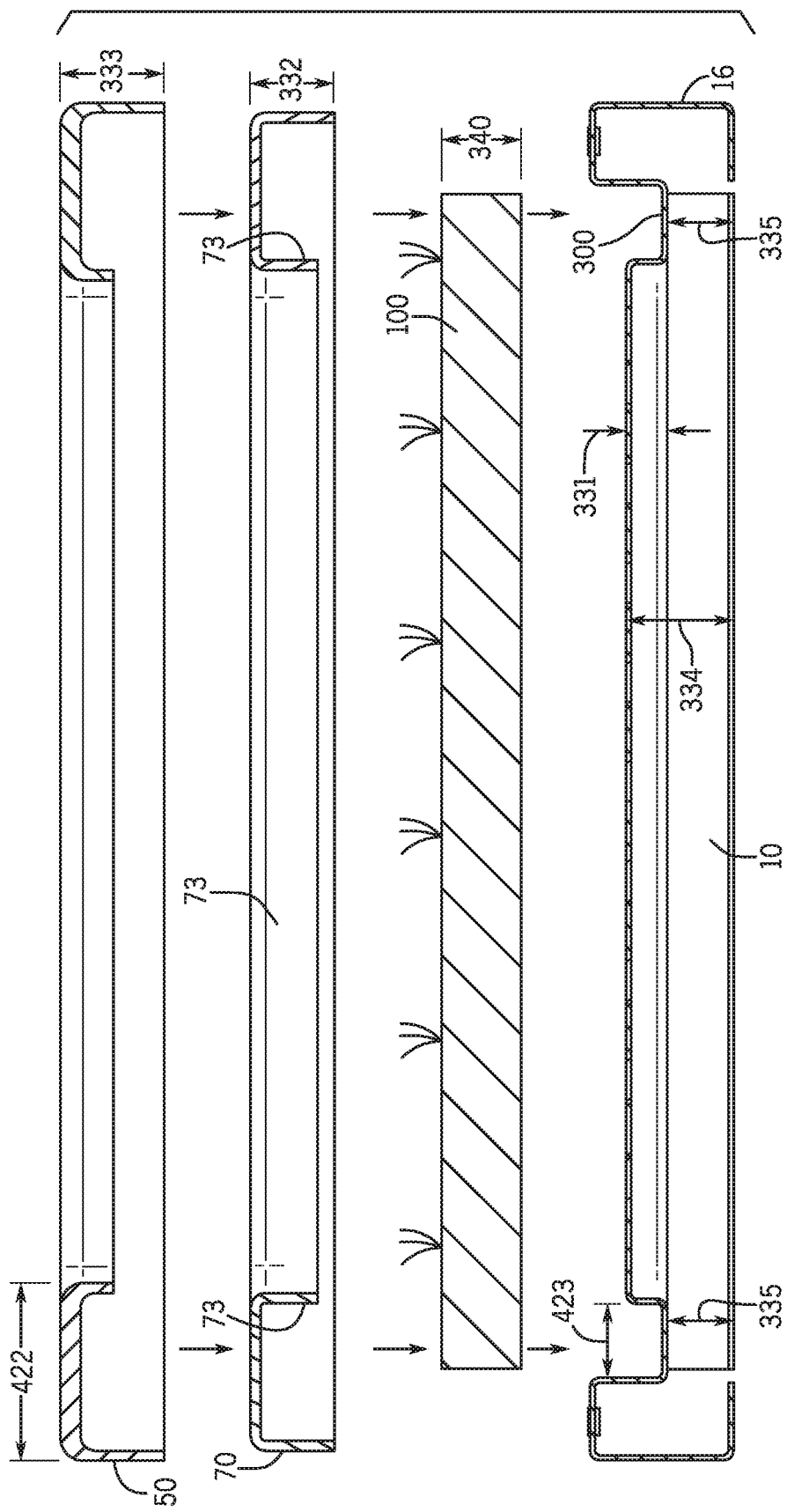
FIG. 10 illustrates an alternative embodiment wherein the perimeter edges of the base are lower than the central portion of the base and wherein the golf swing surface is shown in the exploded view prior to the protective strip and the securing strip being secured to the sod.
Figure 11:
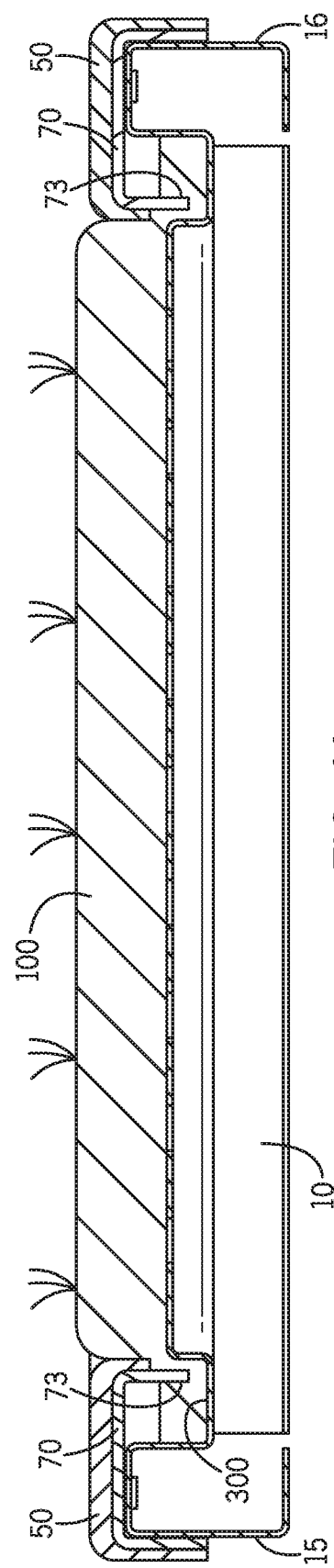
FIG. 11 illustrates an alternative embodiment wherein the perimeter edges of the base are lower than the central portion of the base and wherein the golf swing surface is shown in cross section of the functional unit just prior to use.
Figure 13:
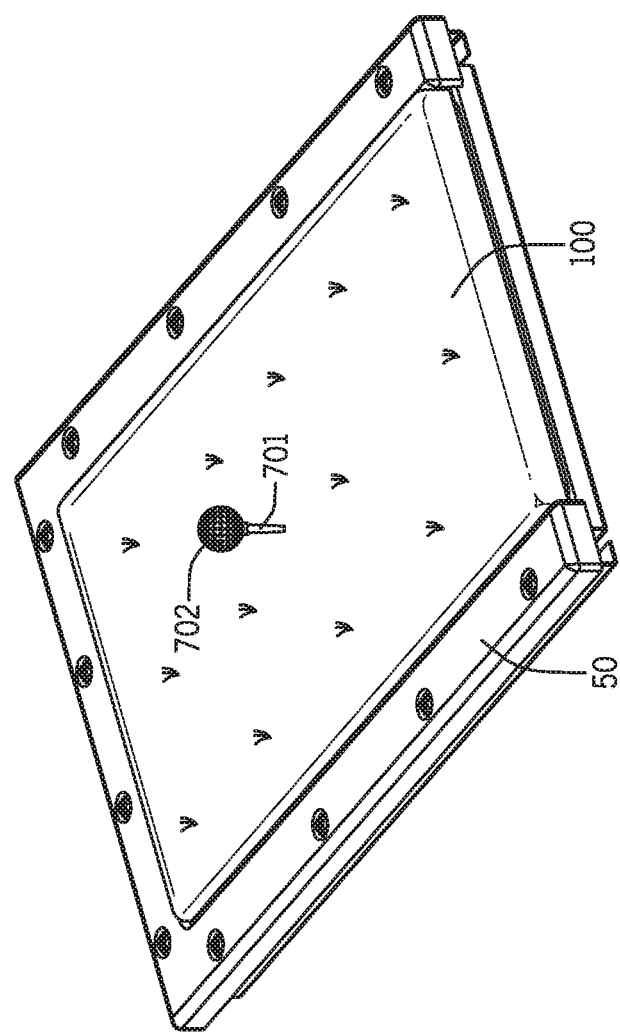
FIG. 13 illustrates the fully functional golf swing surface in an embodiment.

In an embodiment as shown in FIGS. 10 and 11, the first side 15, the second side 16 and the back 14 of the base unit 10 may have a lowered strip portion 300 (or 'channel') which extends lower than the center portion and remainder of the base unit 10. More specifically, the lowered strip portion 300 may run along near, but not directly at, the terminal ends of the sides 15, 16 and the terminal end of the back 14 of the base unit 10. The lowered strip portion 300 of three of the four perimeter edges of the base unit 10 may allow the sod 100 to be lowered at these edges with respect to the sod 100 located at the center and the remainder of the base unit 10. As a result, the protective strip 50 remains flush or even lower than the top of the sod 100 at the center and remainder of the base unit 10. The sod 100 is therefore the highest surface on the device 1, as shown in FIG. 11. As a result, a swinging golf club is unlikely to strike the protective strip 50 since it will be lower than the sod 100. Therefore, the likelihood of injury is prevented.

In this embodiment, the lower strip portion 300 (or channel) has a width 423 which is less than the width 422 of the arms of the protective strip 50 and securing strip 70. Further, in an embodiment, the lower strip portion 300 of the base unit 10 may have a height 335 which is lower than the height 334 at the center of the base 10. The securing strip 70 may have a height 332 and the protective strip 50 may have a height 333.

The three interior facing edges 73 of the securing strip 70 arms all therefore partially are secured/located within the lowered strip portion 300 of the base unit 10 when the device 1 is in the functional form and ready for use for a practice golf swing, as shown in FIG. 11. The interior facing edges 73 of the securing strip 70 therefore grasps the sod 100 and help secure the sod 100 along the lowered strip portion 300 of the base unit 10.

Figure 2:
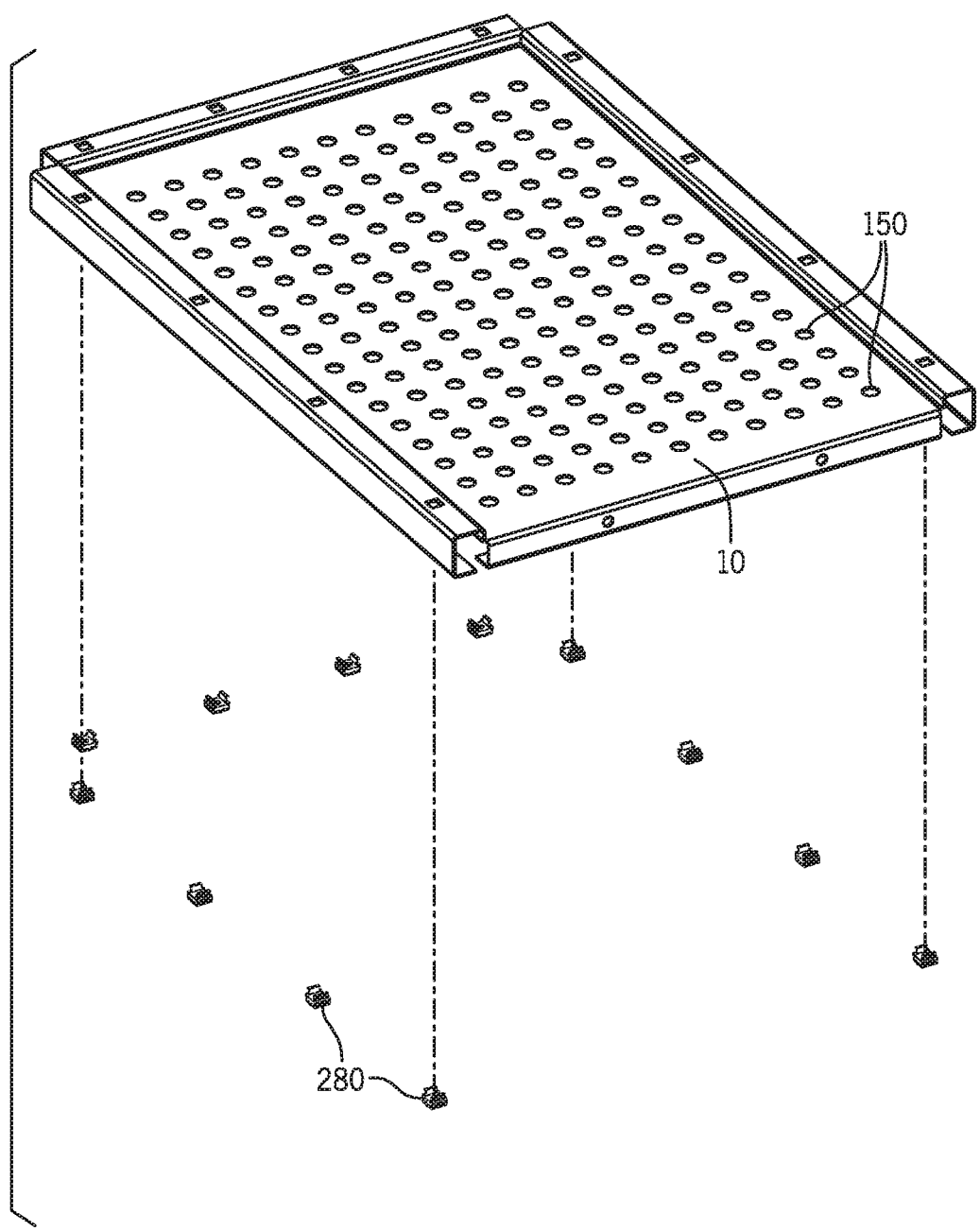
FIG. 2 illustrates a perspective view of an embodiment of the base of the portable golf practice swing surface wherein securing nuts are in the process of being secured to the bottom of the surface and wherein the water drainage holes of the base are visible.

Finally, to use the device, a user first unscrews the securing devices 65 from the protective strip 50, the securing strip 70 and the base 10 and then completely pulls the protective strip 50 and the securing strip 70 off the used sod 100. The used sod 100 may then be pulled off the top surface 11 of the base 10 and replaced with new sod 100. Once the new sod 100 is located on top 11 of the base 10, the securing strip 70 is placed down and then the protective strip 50. Once aligned, the securing devices 65 are inserted into the holes 60 of the protective strip 50 and travel through the holes 75 of the securing strip 70, the sod 100, the base 10 and finally are received by nuts 280 (FIG. 2) located beneath the bottom 12 of the base 10. The surface 1 may then be used to practice a golf swing. Once used, the reverse process is followed to remove and replace the sod 100 with fresh sod 100. (It should be noted at a synthetic grass surface may also be secured to the top 11 of the base 10 as opposed to real sod 100). In one embodiment, the securing strip 70 and the protective strip 50 may be a single unit which is not capable of being separated.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A portable surface for practicing a golf swing comprising:
    a base unit having a front, a back, a first side, a second side, a top surface and a bottom surface and wherein the top surface of the base unit is capable of receiving a piece of sod;
    a securing strip wherein the securing strip is capable of securing the sod to the top surface of the base unit wherein the securing strip has a first edge, a second edge and a third edge and wherein the third edge partially is inserted into the sod to secure the sod to the top of the base unit and wherein the second edge of the securing strip is the top surface of the securing strip; and
    a plurality of teeth located on a bottom edge of the securing strip wherein the plurality of teeth are capable of securing the sod to the base unit.

2. The portable surface for practicing a golf swing of claim 1 further comprising:
    at least one drainage hole located on the base unit wherein the drainage hole is capable of allowing excess water to drain from the sod.

3. The portable surface for practicing a golf swing of claim 1 further comprising:
    a plurality of spikes on the top surface of the base unit wherein the plurality of spikes are capable of securing the sod to the base unit.

4. The portable surface for practicing a golf swing of claim 3 further comprising:
    a height of the plurality of spikes wherein the height of the plurality of spikes is less than a thickness of the sod.

5. The portable surface for practicing a golf swing of claim 1 further comprising:
    a protective strip wherein the protective strip is attached to the top surface of the securing strip.

6. The portable surface for practicing a golf swing of claim 5 wherein the protective strip is made of rubber or plastic.

7. The portable surface for practicing a golf swing of claim 1 wherein the securing strip is secured to the base unit along a perimeter of the base unit and wherein a gap is located along the securing strip so that the securing strip does not completely cover the perimeter of the base unit.

8. The portable surface for practicing a golf swing of claim 1 wherein the base unit is made of metal.

9. The portable surface for practicing a golf swing of claim 1 further comprising:
a plurality of holes on the top surface of the securing strip wherein the plurality of holes align with securing holes in the base unit and allow a securing mechanism to temporarily secure the securing strip to the base unit.

10. The portable surface for practicing a golf swing of claim 1 further comprising:
a carrying handle secured to the base unit wherein the carrying handle rotates from a first position to a second position.

11. The portable surface for practicing a golf swing of claim 1 wherein the base unit has a lowered strip portion having a smaller width than a width of the remainder of the base unit and wherein the securing strip grasps and partially secures sod within the lowered strip portion.

12. The portable surface for practicing a golf swing of claim 1 wherein the first edge of the securing strip is not inserted into the sod.

13. A method for securing sod to a portable surface for practicing a golf swing comprising the steps of:
providing a base unit having a front, a back, a first side, a second side, a top surface and a bottom surface and wherein the top surface of the base unit is capable of receiving a piece of sod;
providing a securing strip wherein the securing strip is capable of securing the sod to the top surface of the base unit wherein the securing strip has a first edge, a second edge and a third edge and wherein the third edge partially is inserted into the sod to secure the sod to the top of the base unit and wherein the second edge of the securing strip is the top surface of the securing strip;
placing a strip of sod on the base unit and securing the securing strip over a portion of the sod so that the securing strip grasps and secures a portion of the sod between the securing strip and the base unit; and
a plurality of teeth located on a bottom edge of the securing strip wherein the plurality of teeth are capable of securing the sod to the base unit.

14. The method for securing sod to a portable surface for practicing a golf swing of claim 13 further comprising the step of:
providing at least one drainage hole located on the base unit wherein the drainage hole is capable of allowing excess water to drain from the sod.

15. The method for securing sod to a portable surface for practicing a golf swing of claim 13 further comprising the step of:
providing a plurality of spikes on the top surface of the base unit wherein the plurality of spikes are capable of securing the sod to the base unit.

16. The method for securing sod to a portable surface for practicing a golf swing of claim 13 further comprising the step of:
providing a protective strip wherein the protective strip is attached to the top surface of the securing strip.

17. The method for securing sod to a portable surface for practicing a golf swing of claim 16 wherein the protective strip is made of rubber or plastic.

18. A portable surface for practicing a golf swing comprising:
a base unit having a front, a back, a first side, a second side, a top surface and a bottom surface and wherein the top surface of the base unit is capable of receiving a piece of sod;
a securing strip wherein the securing strip is capable of securing the sod to the top surface of the base unit wherein the securing strip has a first edge, a second edge and a third edge and wherein the third edge partially is inserted into the sod to secure the sod to the top of the base unit and wherein the second edge of the securing strip is the top surface of the securing strip; and
wherein the base unit has a lowered strip portion which has a lower height than the top surface of the base unit and wherein the securing strip secures the sod to the base unit within the lowered strip portion of the base unit.

19. A portable surface for practicing a golf swing comprising:
a base unit having a front, a back, a first side, a second side, a top surface and a bottom surface and wherein the top surface of the base unit is capable of receiving a piece of sod;
a securing strip wherein the securing strip is capable of securing the sod to the top surface of the base unit wherein the securing strip has a first edge, a second edge and a third edge and wherein the third edge partially is inserted into the sod to secure the sod to the top of the base unit and wherein the second edge of the securing strip is the top surface of the securing strip; and
wherein the securing strip is secured to the base unit along a perimeter of the base unit and wherein a gap is located along the securing strip so that the securing strip does not completely cover the perimeter of the base unit.

20. A portable surface for practicing a golf swing comprising:
a base unit having a front, a back, a first side, a second side, a top surface and a bottom surface and wherein the top surface of the base unit is capable of receiving a piece of sod;
a securing strip wherein the securing strip is capable of securing the sod to the top surface of the base unit wherein the securing strip has a first edge, a second edge and a third edge and wherein the third edge partially is inserted into the sod to secure the sod to the top of the base unit and wherein the second edge of the securing strip is the top surface of the securing strip; and
a plurality of holes on the top surface of the securing strip wherein the plurality of holes align with securing holes in the base unit and allow a securing mechanism to temporarily secure the securing strip to the base unit.

\* \* \* \* \*